H. SIGMAN.
JAW TRAP.
APPLICATION FILED SEPT. 17, 1909.
966,612.
Patented Aug. 9, 1910.
2 SHEETS—SHEET 1.
Fig. 1.
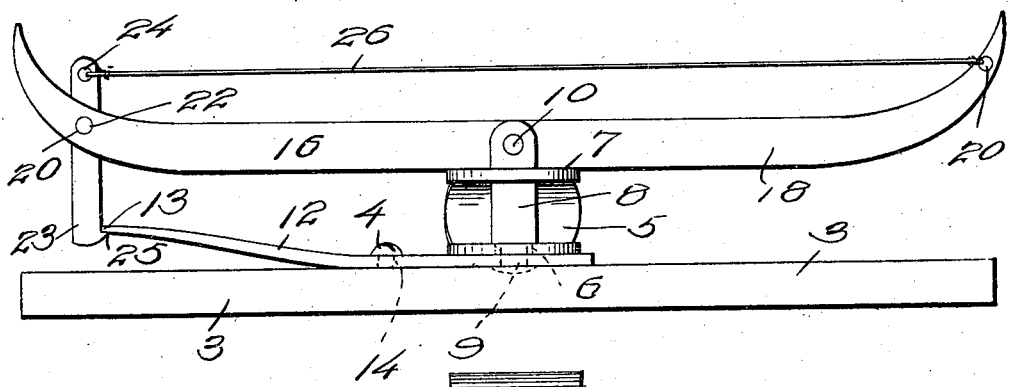
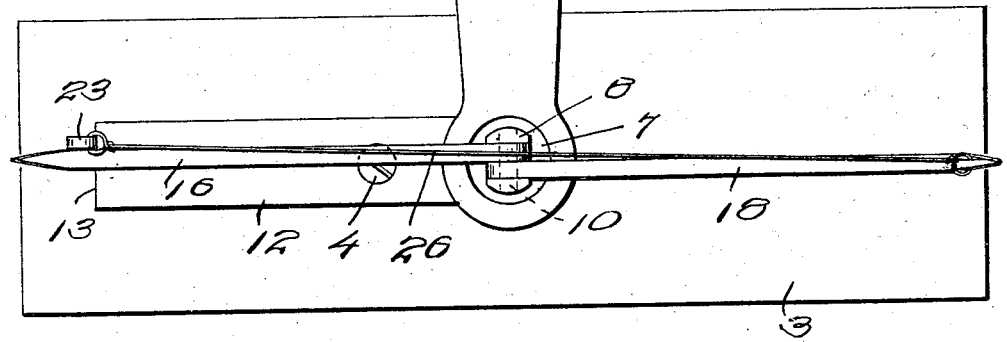
Fig. 2.
Witnesses
Inventor
Harry Sigman,
By Woodward & Chandler
Attorneys H. SIGMAN.
JAW TRAP.
APPLICATION FILED SEPT. 17, 1909.
966,612.
Patented Aug. 9, 1910.
2 SHEETS—SHEET 2.
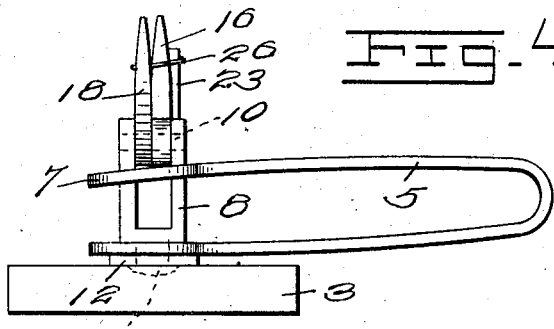
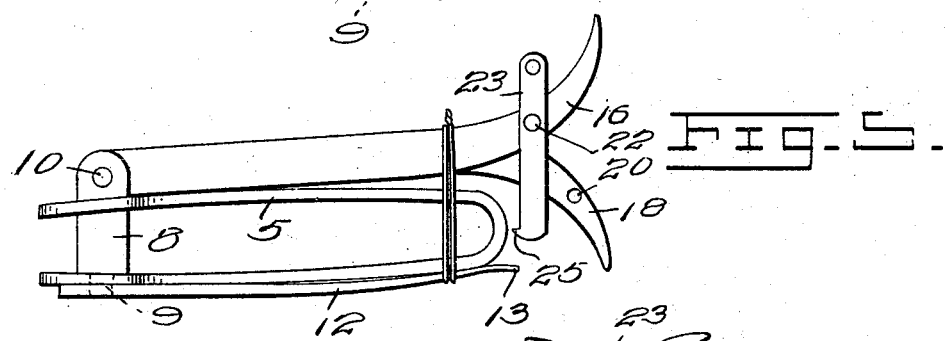
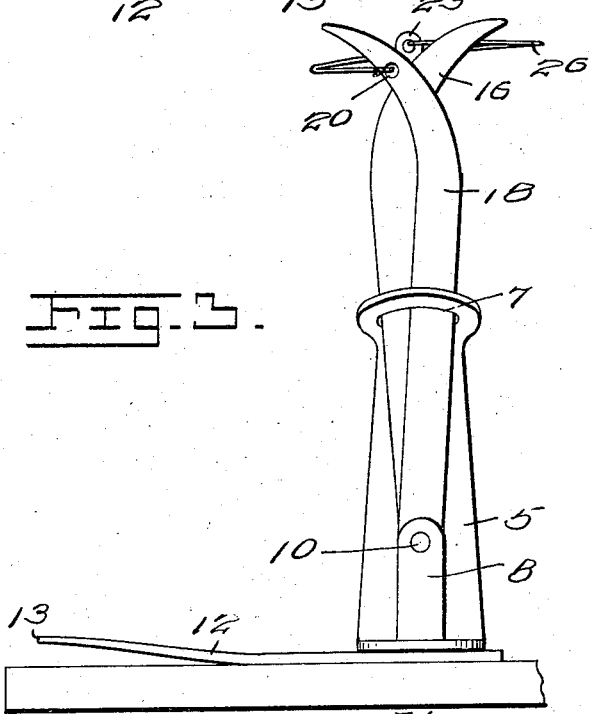
Inventor
Harry Sigman,
By Woodward & Chandlee
Attorneys
Witnesses

UNITED STATES PATENT OFFICE.

HARRY SIGMAN, OF VOLTAIRE, NORTH DAKOTA.

JAW-TRAP.

966,612.	Specification of Letters Patent.	Patented Aug. 9, 1910.

Application filed September 17, 1909. Serial No. 518,231.

*To all whom it may concern:*

Be it known that I, HARRY SIGMAN, a citizen of the United States, residing at Voltaire, in the county of McHenry and State of North Dakota, have invented certain new and useful Improvements in Jaw-Traps, of which the following is a specification.

This invention has relation to certain new and useful improvements in jaw traps.

The object of my invention is to provide a light, positively operating trap, arranged to be placed in the trail or path traveled by the animal to be caught, the trap being hit and sprung in touching a trigger strand.

Another object is to provide a game trap so constructed that the same can be folded to form a neat and compact package when the same is not in use.

With the above and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a portion of this specification, and in which like numerals of reference indicate similar parts in the several views, Figure 1 shows an elevational view of the trap set, Fig. 2 shows a top view of the trap set, Fig. 3 shows an elevational view disclosing the trap as sprung, Fig. 4 shows a side view of the trap as set, Fig. 5 shows the trap as folded.

In carrying out the aim of my invention, I employ a U-shaped leaf spring 5, having a bolt opening 6 at one end, and the eye 7 at the other, the eye and bolt openings being made to register when the spring is in a compressed condition. Held within the bolt opening 6 is the slotted bolt 8 having the securing stem 9, extending through the bolt opening 6, while held within the slotted end of the bolt is the pin 10.

Pivotally held upon the stem 9, is the trigger bar 12, the outer end of the extension 9 being flanged to hold the trigger bar to the end of the spring as disclosed. This trigger bar 12 is provided with the opening 14 arranged to receive a securing screw 4, or the link of a suitable securing chain. As shown, the outer end of this trigger bar is slightly curved upward and ends in the lip 13.

Pivotally held upon the pin 10, are the two similar curved jaws 16 and 18, each being provided with an aperture 20 as disclosed. Held within the aperture 20 is the pin 22 which pivotally supports the latch 23 having the perforations 24 at one end and the engaging lip 25 at the other. This lip 25 is arranged for coaction with the end of the trigger bar 12.

Extending from the aperture 20 within the arm 18, is a pliable connection 26 in the form of a wire or chain which has its end connected to the latch 23, this pliable connection 26 being so arranged that when the trap is set, this connection 26 spans the distance between the points of the jaws as disclosed in Fig. 1. The trap may be secured to a suitable base 3 by means of the screw 4 as shown in the drawings, or the trap may be anchored by means of a chain as has been set forth.

The operation of setting the trap is very simple. The trap having been properly located, the operator depresses the leaf spring so that the jaws can be carried into a horizontal position enabling the operator to bring the latch 23 into engagement with the latch bar 12. The trap can then be entirely covered with leaves or any other suitable material.

In use, and while the trap is set, the trigger bar is held at right angles to the spring. While not in use, however, this trigger bar is brought into alinement with the leaf spring, which is then depressed so that both of the jaws may be brought and be folded upon the upper member of the spring the jaws then being secured by means of wire. In this compact condition the folded trap makes a small package, so that the same may be conveniently carried by the trapper or hunter, or be conveniently stored away.

The trap is simple and inexpensive in construction, and both durable and efficient in operation.

What is claimed is:

1. A trap having in combination the following instrumentalities to wit, a U-shaped spring having an eye at one end and a bolt opening at the other, a slotted bolt within said opening, and at times projecting through said eye, two similar jaws pivotally carried by said bolt, a latch bar pivotally extending from said bolt, a latch pivotally carried by one of said jaws for engagement with said latch bar, and a connection extending from said latch to said remaining jaw.

2. In combination, a U-shaped leaf spring having an eye at one end and a bolt opening at the other, said eye and opening registering, a slotted bolt within said opening arranged at times to project through said eye, a trigger bar pivotally carried by said bolt, a pin within the slotted end of said bolt, two similar curved jaws pivotally carried by said pin each having an aperture near its gripping point, a pin within one of said apertures, a latch having a lip pivotally carried by said pin, said latch arranged for coaction with said bar, and a pliable connection extending from said remaining jaw aperture and secured to said latch.

In testimony whereof I affix my signature, in presence of two witnesses.

HARRY SIGMAN.

Witnesses:
    E. R. DENNISON,
    F. A. NELSON.